(12) United States Patent
Cochin et al.

(10) Patent No.: US 10,476,899 B2
(45) Date of Patent: Nov. 12, 2019

(54) APPLICATION PHENOTYPING

(71) Applicant: McAfee, LLC, Santa Clara, CA (US)

(72) Inventors: Cedric Cochin, Portland, OR (US); John D. Teddy, Portland, OR (US); Ofir Arkin, Petach Tikva (IS); James Bean, Tigard, OR (US); Joel R. Spurlock, Newberg, OR (US); Carl Woodward, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/866,459

(22) Filed: Sep. 25, 2015

(65) Prior Publication Data

US 2017/0093897 A1    Mar. 30, 2017

(51) Int. Cl.
*H04L 29/06* (2006.01)
*G06F 21/56* (2013.01)
*G06F 16/33* (2019.01)

(52) U.S. Cl.
CPC ........ *H04L 63/1425* (2013.01); *G06F 16/334* (2019.01); *G06F 21/566* (2013.01); *H04L 63/145* (2013.01); *H04L 63/1416* (2013.01)

(58) Field of Classification Search
CPC ............. H04L 63/1416; H04L 63/1425; H04L 63/1441; H04L 63/145
See application file for complete search history.

(56) References Cited

U.S. PATENT DOCUMENTS 7,185,367 B2 * 2/2007 Munson ............... G06F 11/3612
714/E11.209
7,779,472 B1 * 8/2010 Lou ........................ G06F 21/566
726/22

(Continued)

FOREIGN PATENT DOCUMENTS

WO    2015094223 A1    6/2015
WO    2017053365       3/2017

OTHER PUBLICATIONS

U.S. Appl. No. 14/498,266, filed Sep. 26, 2014.

(Continued)

*Primary Examiner* — Yogesh Paliwal
*Assistant Examiner* — Hassan Saadoun
(74) *Attorney, Agent, or Firm* — Hanley Flight & Zimmerman, LLC

(57) ABSTRACT

A collection of techniques is disclosed to allow for the detection of malware that leverages pattern recognition and machine learning to effectively provide "content-less" malware detection, i.e., detecting a process as being an 'anomaly' not based on its particular content, but instead based on comparisons of its behavior to known (and characterized) 'trusted' application behaviors, i.e., the trusted applications' "phenotypes" and/or the phenotypes of known malware applications. By analyzing the patterns of normal behavior performed by trusted applications as well as malware applications, one can build a set of sophisticated, content-agnostic behavioral models (i.e., "application phenotypes")—and later compare the processes executed on a user device to the stored behavioral models to determine whether the actual measured behavior reflects a "good" application, or if it differs from the stored behavioral models to a sufficient degree and with a sufficient degree of confidence, thus indicating a potentially malicious application or behavior.

25 Claims, 7 Drawing Sheets

(56) References Cited

U.S. PATENT DOCUMENTS

| 8,607,340 B2 | 12/2013 | Wright | |
|---|---|---|---|
| 2005/0086500 A1* | 4/2005 | Albornoz | G06F 21/316 |
| | | | 713/188 |
| 2008/0005796 A1 | 1/2008 | Godwood et al. | |
| 2008/0109871 A1 | 5/2008 | Jacobs | |
| 2008/0201722 A1 | 8/2008 | Sarathy | |
| 2011/0023118 A1* | 1/2011 | Wright | G06F 11/28 |
| | | | 726/23 |

OTHER PUBLICATIONS

International Searching Authority, "Search Report & Written Opinion," issued in connection with application No. PCT/US2016/052785, dated Dec. 16, 2016, 13 pages.

Comparetti et al., "Identifying Dormant Functionality in Malware Programs," Int. Secure Systems Lab Vienna University of Technology, May 17, 2010, 31 pages.

International Searching Authority, "International Preliminary Report on Patentability," issued in connection with application No. PCT/US2016/052785, dated Apr. 5, 2018, 12 pages.

* cited by examiner

APPLICATION PHENOTYPING

TECHNICAL FIELD

Embodiments described herein generally relate to malware detection and, in particular, to the detection of malware infections (and other anomalies) via the creation and use of so-called "application phenotypes," as well as various analytic techniques, such as neural networks and machine learning.

BACKGROUND ART

Malware infections on computers and other electronic devices are very intrusive and hard to detect and repair. In fact, malware and exploits often evade detection altogether, forcing constant software updates to the prevention and detection technologies installed on user devices. Anti-malware solutions may operate by matching a signature of malicious code or files against software that has been approved (i.e., a "whitelist") to determine whether the software is harmful to a computing system. However, malware may disguise itself through the use of polymorphic programs or executables, wherein the malware changes itself to avoid detection by anti-malware solutions. In such cases, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

Existing solutions that attempt to perform malware and anomaly detection using "whitelisting," while a simple and efficient way to protect a system against malware, are often ineffective against exploits and are highly restrictive—most frequently resulting in 'binary' rules to either allow or block actions, making it extremely difficult to use in a fluid and customized consumer setup. While detecting and blocking programs that have been "blacklisted" is achievable, addressing programs that are "gray" (i.e., neither approved nor disapproved) is a growing challenge in the field of malware detection.

Thus, what is needed is a system that performs malware (and other anomaly) detection, leveraging both pattern recognition and machine learning to effectively provide "content-less" malware detection, i.e., detecting a process as being an 'anomaly' not based on its particular content, but instead based purely on comparisons of its behavior to known (and characterized) 'normal' application behaviors, i.e., the application's "phenotype." By analyzing the patterns of normal behavior commonly performed by approved applications, one can build a set of sophisticated, content-agnostic behavioral models (i.e., "application phenotypes") for particular applications—and later compare the processes executed on a user device to the stored behavioral models to determine whether the actual measured behavior differs from the stored behavioral models to a sufficient degree and with a sufficient degree of confidence, thus indicating a potentially malicious process or behavior.

DESCRIPTION OF EMBODIMENTS

Figure 1:
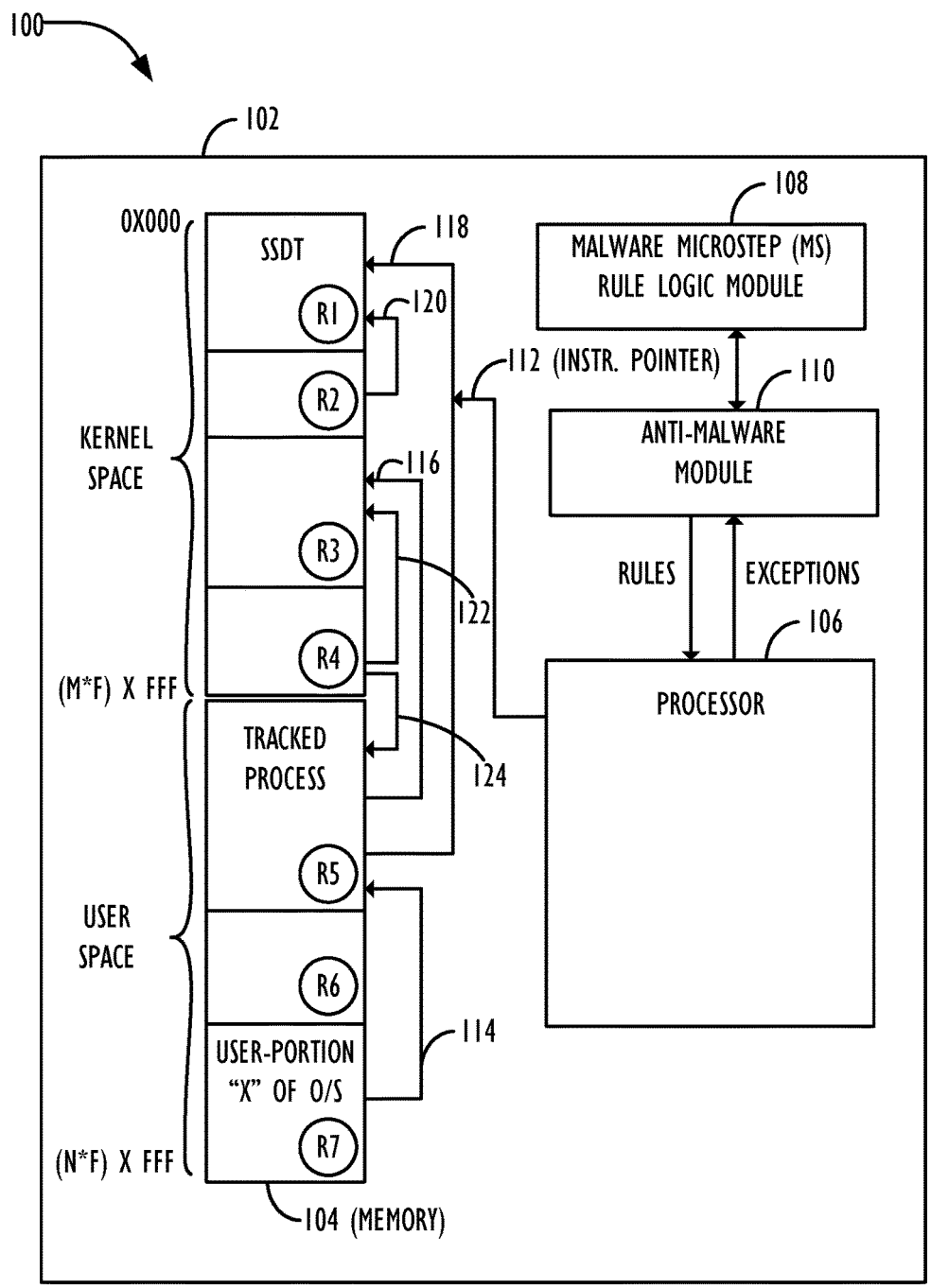
FIG. 1 is an illustration of an example embodiment of a system for profiling code execution.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

Increasingly, cyber-attacks on businesses, government agencies, and others are covert and persistent. As a result, the ability to detect covert communications becomes increasingly more important to being able to deal with threats to intellectual property and personal information theft. However, as summarized below, many of the techniques employed by today's systems to detect malware and other exploits either have significant drawbacks or are overly restrictive. Current approaches to malware detection include the following:

Static Malware Detection:

Compared to static malware detection, the application phenotype is not impacted by minute alterations to the original sample. This is because application phenotypes do not rely on signatures.

Behavioral Protection:

Behavioral solutions monitor the actions of an application—but not how and why an action is performed. As an example, behavioral monitoring may observe that Internet Explorer ("IE") wrote a file to disk, but it would not be able to differentiate the scenario where IE was instructed by a user to save a file to disk from the scenario where an exploit took place in the context of IE and the malicious payload is now writing a file to disk. "Application Phenotyping," as described below, would be able to differentiate between the two scenarios—allowing the first one, while blocking the second. Whereas behavioral solutions tend to focus on malware, application phenotypes focus on "white" applications and the particular sequence of steps required to be performed for a white application to perform tasks of interest (e.g., establishing a network connection, writing to disk, etc.).

HIPS and Exploit Prevention:

Host Intrusion Prevention Systems (HIPS) and exploit prevention solutions focus on a set of particular exploit techniques (e.g., buffer overflow, stack pivot, heap spray, Return-oriented programming ("ROP"), etc.). Application phenotypes would block the exploit attempts by comparing the sequence of actions that led to the exposed behavior with the sequences defined in the phenotype. If the current sequence doesn't exist in the phenotype, the behavior would either be flagged or blocked outright. As an example, when IE writes a file to disk after a ROP exploit, the sequence of actions (e.g., the execution of so-called "gadgets") that led to the call to the write API would not defined as an accepted sequence in the original IE phenotype, thus resulting in the specific malicious write action being blocked.

Whitelisting and Application Control Technologies:

Existing whitelisting technologies enforce a set of binary rules. While they may generate an automatic list of applications and potential associated behaviors, they do not consider the so-called "microsteps" (as will be described in detail below) that led to the behavior being exhibited. For example, a given malware protection program may block all network connection from the Calculator program. "calc.exe" based on a predefined rule, but it will not learn from the usage of calc.exe if establishing a network connection is, in actuality, a valid behavior for calc.exe, and it will not be able to identify the specific sequence of API calls that lead to the network connection being established. In a similar manner, a "whitelisting" solution would allow IE to establish a network connection, irrespective of how the connection is established (e.g., whether it was established during the course of normal browsing behavior or an unauthorized ROP exploit).

Closed OSes and Application Permissions:

Closed Operating Systems ("OSes") provide, via the default install process of applications, a mechanism to highlight the permissions required by an application to function correctly. The permissions requested may, as an example, include access to the network or to the storage. The permission, while beneficial to restrict Potentially Harmful Applications ("PHAs") would not prevent a clean application that was granted network access from establishing a malicious connection while being exploited.

Thus, disclosed herein are various techniques to overcome the shortcomings of static, software-based malware analysis, as well as other existing malware detection methods outline above. Specifically, disclosed herein are systems and methods to implement a novel "application phenotyping" framework to support secure, efficient, dynamic, and content-agnostic analysis of programs and processes to detect malware or other anomalies. This approach solves several of the other common problems with prior art, software-based malware detection techniques.

Application Phenotyping: An Introduction

Phenotype, classically, from a biological point of view, refers to the summary of all the characteristics and behaviors of an organism, defined by its genotype plus the effect of the environment, plus any developmental changes that have happened to the organism over its life. In order to do roughly the same type of characterization with "good" or "approved" applications, such that deviations from these "good" or "approved" application, which are likely to be malicious, may be identified, the embodiments described herein employ the novel concept of "microsteps."

In the case of computer applications, it would be impractical and error-prone to define a phenotype by individual operations performed by the application (particularly if the operations occur across multiple threads and/or the sequence of operations is variable). Thus, as described in the embodiments disclosed herein, individual operations (or sequence of APIs) may be aggregated into microsteps, i.e., a high-level description of the intent of the combined operations. An application phenotype constructed of sequence(s) of individual microsteps will be easier to store and compare. It will also be less error-prone and make it significantly easier to identify known good behaviors and known bad behaviors, as well as optionally forward unknown behaviors to a classification engine. According to embodiments disclosed herein, then, the malware detection system will look for deviations from the "normal" behavior. The intent is to do this purely heuristically, i.e., in a "content-agnostic" or "content-less" fashion.

Microsteps

As mentioned above, the basic principle of "application phenotyping" is to characterize the behavior of known, good applications using objects referred to herein as "microsteps." Microsteps may be thought of as collections of behaviors that map onto "logical intent." In other words, microsteps are essentially a way to 'up-level' standard kernel-level operations (e.g., files, registry, register keys, processes, network operations, etc.) into a high-level concept. Microsteps may also represent the aggregation of individual low-level operations and high-level contextual information delivered by various program APIs. Moreover, microsteps may be broken down further into both first-tier and second-tier microsteps, as is explained in further detail below.

First-tier Microsteps: First-tier microsteps comprise an aggregation or sequence of different operations on kernel objects that represent a higher-level function, e.g., a browser that calls a function "Internet Create Cookie." Inherent to this higher-level function could be, e.g., registry activity that allows a process to figure out where the cookie store is. A process may then call some other APIs to "create cookie," and drop data in it, etc. Then, all of these processes may need to be closed down. All in all, this seemingly simple process of creating a cookie could represent a sequence of, e.g., twenty operations. These twenty operations could then be "up-leveled" into one microstep that is created for a given Internet session.

Second-tier Microsteps: Second-tier microsteps may indicate much higher-level operations that are combinations of individual first-tier microsteps. E.g., an "Open File Dialog" on Windows has many concepts involved, e.g., registry, I/O, etc., which may include first-tier microsteps, such as: "Initialize the shell object name space for My Network Places"; "Determine my current directory"; Send Query; Draw Shape; and Close Window, etc. Another example of a second-tier microstep might be "Instantiate COM Object." [This second-tier microstep could potentially include a much larger number of microsteps, e.g., load up a COM object with this GUID, determine where it lives on disk, determine an object model, instantiate object, load.dll's, etc.].

The goal, according to some embodiments disclosed herein, then, would be to characterize the behavior of an application by a series of "Second-tier Microsteps." For example, a system may want to characterize "IE startup" as a collection of second tier microsteps. Or, it may want to characterize "IE is doing nothing" as a microstep. Either of these hypothetical second-tier microsteps, alone or in combination could be deemed to be "normal" behaviors. There could also be "normal" behaviors defined based on typical user behaviors, e.g., visiting a website such as www.google.com could be represented by a typical set of second-tier microsteps. According to some embodiments, microsteps must be able to tolerate a certain amount of "variance" in the underlying operations and still resolve to the same pre-identified "microstep." For example, the order that events come in and/or the paths of objects that are accessed could differ slightly from operation to operation, but they should still be identifiable as the "same" microstep if they share a sufficient number of core characteristics/behaviors. The end result of developing sufficiently robust microsteps, then would be microsteps that could be applied to any machine in the world, irrespective of how the machine is configured, and the monitoring system would be able to determine if the application is 'behaving' in a normal manner. By looking for the known operations, the system may quickly be able to find deviations.

Why Microsteps?

Empirical research reveals that applications are not initiated in a "random" manner. In fact, most applications are executed by following a standard and fairly static pattern. Deviation from said pattern is often an anomaly. Empirical research further reveals that applications also have a limited number of behaviors. An exhaustive list of all these behaviors may be generated, and then any observed behavior that is not in the original list may be considered an anomaly. While users can influence the behavior of an application, they cannot change the set of functions offered by said application. For example, the Calculator program in the "calc.exe" example does not establish network connections. No matter what action(s) a user attempts to take with the Calculator program, it should not establish an Internet connection. In other words, the behavior of "Establishing a network connection" is not part of the standard application phenotype of "calc.exe," and, therefore, attempts by such program to perform such behavior should likely be blocked.

Some exploits use so-called "Return-Oriented Programming (ROP) attacks," i.e., a technique where the malicious program manipulates the stack so that it returns to a different place from where it originated. ROP attacks were created by malware developers in response to Host Intrusion Prevention Solutions (HIPS), which marked certain pages at 'not executable,' so that their payload was no longer executable. To circumvent this, some malware attempts to chain together small subsets of already existing instructions (i.e., "gadgets"), and then transfer control to their malicious payload. So, the normal path of Microsoft Word opening a file may involve: determine whether the file is present; determine whether the process has the right to open the file; parsing the file; defaulting to a "Read Only" mode, and then finally displaying the file, etc. Typically, a malicious program may just open the file right away, and may even open the file in a different manner (e.g., skipping the open in "Read Only"

mode step), so there would be many attributes that differed from the normal opening of the file. A malware detection employing microsteps and application phenotypes wouldn't necessarily know that such a ROP attack was "bad" per se; it would just be flagged as "not normal" (i.e., not a chain that we allowed originally), and so it would be able to block it or request further approval/investigation from an administrator or user.

As stated above, there are often a limited number of paths that would lead to a particular behavior exhibited by a particular application. Thus, by monitoring trigger events and comparing the API sequence that led to the event to the defined set of approved API calls (most frequently involving OS-level APIs), one could block attack like code/DLL injection or exploits (including ROP and "gadget" chaining). To consider a concrete example, while "Establishing a network connection" may be part of the standard application phenotype of Internet Explorer, the way internet explorer establishes these connections follows a known sequence of OS system calls. When Internet Explorer is the target of an exploit, the sequence of APIs that leads to "Iexplorer.exe" establishing a network connection differs from the known "normal" sequences. The difference may be detected, which allows for the behavior to be blocked by the malware prevention system.

Further, while it may be normal for Internet Explorer to send and receive encrypted data to and from one or more Internet servers, it may not be normal to send encrypted data and not process a response. Not receiving a response could, e.g., indicate the presence of malicious software running in the context of Internet Explorer by sending secrets out to a third-party server. By "up-leveling" the individual operations using the aforementioned micro-steps, it becomes easier to identify the malicious network behavior microstep: "Send encrypted data." In addition, the process of identification of a malicious microstep may be greatly simplified by removing all known good microsteps from the analysis process. Whatever microsteps are left over may be considered to be either "unknown" microsteps or "known bad" microsteps.

Thus, the inventors have realized that each application's phenotype may be defined by the particular scenarios that led to the application being executed, the behaviors the application exhibits, and the sequence of microsteps undertaken taken to perform the exhibited behaviors. The concept of application phenotype ties together many aspects of application's genealogy, behavioral monitoring, and the application's tracing and emulation down to the instruction level.

A Content-less Approach

Another element that distinguishes application phenotypes from the existing solutions in the field, is the ability to ship the solution in a content-less fashion. In other words, by executing the solution in a "learning mode" on a clean system for some amount of time, the list of the normal behaviors and their associated microsteps may be gathered and stored locally before locking down the device and enforcing the recorded phenotypes. In other embodiments, the solution could be shipped in a hybrid fashion, that is, shopped with some set of "normal" behaviors for commonly-used applications (e.g., MS Office), but then also implement a "learning mode," since "normal" operation could differ slightly from system to system.

According to some embodiments, the "learning" and "enforcement" processes for application phenotyping may involve the following generalized steps:

1.) Every time a process is launched, it is traced, i.e., "phenotyped." The process may be "known white," "known black," or "gray." The phenotype may computed and stored locally, and/or on at enterprise level, and/or in the "cloud," i.e., on a network-accessible server.

2.) Each time a new phenotype trace is generated, it may be stored and compared to the prior results. Using this process, it is possible to "crowd-source" a collection of traces for a given process.

3.) If a deviation from the stored phenotype is observed, a new reputation value may be set, along with a confidence score. The reputation and confidence score may be influenced by both the type of deviation from the stored phenotype, as well as the magnitude of the deviation.

4.) In the absence of a direct match, the computed phenotype may be compared to known bad and known good phenotypes. The comparison yields a reputation and confidence score. The closer the match, the greater the confidence that a given behavior is the same as a known phenotype.

Before particular application behaviors may be compared to other known behaviors and application phenotypes, the system must be able to monitor and profile code execution in the pertinent portions of the operating system. Thus, turning now to FIG. 1, an illustration of an example embodiment of a system 100 for profiling code execution is shown. System 100 may be configured to profile the execution of code on an electronic device as it is dynamically loaded and executed. By profiling the execution of code, system 100 may monitor the execution for patterns of execution that indicate malware. In one embodiment, system 100 may perform such monitoring without the use of an operating system or application hooking. In another embodiment, system 100 may perform such monitoring through the use of exception loading on a processor. In yet another embodiment, system 100 may perform profiling of code execution by recording and evaluating transitions between different address spaces.

System 100 may include an anti-malware module 110 configured to evaluate whether an electronic device 102 is infected with malware. Anti-malware module 110 may be resident upon electronic device 102 or upon an electronic device communicatively coupled to electronic device 102. Anti-malware module 110 may be communicatively coupled to a processor 106 of electronic device 102 and to malware-microstep rule logic 108. Anti-malware module 110 may be configured to access malware-microstep rule logic 108 to determine what portions of a memory 104 of electronic device to monitor. Furthermore, anti-malware module 110 may be configured to access malware-microstep rule logic 108 to determine what transitions from a given portion of memory to another to monitor. Anti-malware module 110 may be configured to define such rules into processor 106 by, for example, configuring processor 106 to generate exceptions when a transition occurs between a first defined address space (or range) to a second defined address space (or range) in a particular way. Processor 106 may be configured to send a resulting exception to anti-malware module 110. Anti-malware module 110 may be configured to access malware-microstep rule logic 108 to determine whether a transition detected by processor 106—along with previously determined transitions—fulfills a sequence, microstep, behavior, phenotype or other rule that is associated with malware.

Malware-microstep rule logic 108 may be resident upon electronic device 102, or upon any other electronic device that is accessible by anti-malware module 110. In one embodiment, malware-microstep rule logic 108 may be resident upon an anti-malware server on a network communicatively coupled to anti-malware module 110. In another embodiment, malware-microstep rule logic 108 may be loaded in memory 104, processor 106, or anti-malware module 110. Malware-microstep rule logic 108 may be implemented in any suitable manner, such as with a server, proxy, application, module, script, library, function, logic, database, file, table, or other data structure or entity. Malware-microstep rule logic 108 may include any suitable information for defining regions of memory 104 to monitor, transitions to monitor, I/O ports to monitor, memory areas for reading or writing, or sequences of transitions (e.g., microsteps) that indicate malware.

Malware-microstep rule logic 108 may include positive rules, by which a monitored operation or sequence (e.g., a first-tier microstep) or a particular sequence of sequences (e.g., a second-tier microstep) is recognized as safe or "normal," or it may employ negative rules, by which a monitored operation, sequence, or sequence of sequences is recognized as malicious. Furthermore, malware may manipulate an expected order of execution in legitimate software, such that individual operations are not malicious and are in fact related to legitimate software, but are conducted in a sequence such that the order of such operations is malicious. Such malware may include, for example, return-oriented programming (ROP). By use of positive rules in combination with one or more negative rules, in comparison to known "normal" application behaviors, one or more "false positive" identifications of malware may be eliminated.

Electronic device 102 may be implemented in any suitable manner. For example, electronic device 102 may include a mobile device, computer, server, laptop, desktop, board, or blade.

Anti-malware module 110 may be implemented in any suitable manner. For example, anti-malware module 110 may include instructions, logic, functions, libraries, shared libraries, applications, scripts, programs, executables, objects, analog circuitry, digital circuitry, or any suitable combination thereof.

Processor 106 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 106 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as electronic device 102 or anti-malware module 110 may reside in memory 104 for execution by processor 106.

Processor 106 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed-width micro operation in a predefined format, or may generate other instructions, microinstructions, or control signals which reflect the original code instruction. Processor 106 may also include register renaming logic and scheduling logic, which generally allocate resources and queue the operation corresponding to converted instructions for execution. After completion of execution of the operations specified by the code instructions, back end logic within processor 106 may retire the instruction. In one embodiment, processor 106 may allow out of order execution but requires in order retirement of instructions. Retirement logic within processor 106 may take a variety of forms as known to those of skill in the art (e.g., re-order buffers or the like). The processor cores of processor 106 are thus transformed during execution of the code, at least in terms of the output generated by the decoder, the hardware registers and tables utilized by the register renaming logic, and any registers modified by the execution logic.

Anti-malware module 110 may be configured to define any suitable portion of memory 104 for monitoring. Anti-malware module 110 may make such definitions through referencing, for example, malware-microstep rule logic 108. For example, anti-malware module 110 may define the portions of memory 104 used for kernel mode operation. In the example of FIG. 1, anti-malware module 110 may define that kernel space, including the memory addresses from (0x000) to ((M*F) x FFF) is to be monitored as a region. In another example, anti-malware module 110 may define the portions of memory 104 used for user mode operation is to be monitored as a region. In the example of FIG. 1, anti-malware module 110 may define that user space, including the memory addresses from ((M*F) x FFF) to ((N*F) x FFF), is to be monitored as a region.

Specific applications, processes, or threads may be identified for monitoring by anti-malware module 110. These may be dynamically tracked as they are loaded into memory 104. In the example of FIG. 1, anti-malware module 110 may define that a particular tracked process, as loaded in the region denoted by R5, is to be monitored. The tracked process may represent a process for which it is unknown whether the process is associated with malware.

Specific portions of an operating system may be identified for monitoring by anti-malware module 110. These portions may be dynamically tracked as they are loaded into memory 104. Memory for any suitable portion of an operating system may be monitored. In the example of FIG. 1, anti-malware module 110 may define that a System Service Dispatch Table (SSDT) as loaded in the region denoted by R1 and a user-portion "X" of an operating system as loaded in the region denoted by R7 may be monitored. Specific elements within regions or operating system constructs, such individual pointers in an SSDT, may also be monitored. Such individual pointers may indicate access of specific, identified functions managed by the SSDT.

Other entities that may be monitored as they reside in memory 104 may include, for example, system shared libraries—including dynamically linked libraries (DLLs), interrupt descriptor tables (IDT), system call tables, user shared libraries, or operating system call dispatchers. Such entities may be used in any suitable operating system. Other regions of memory 104 may be defined, such as regions R2, R3, R4 of kernel space and region R6 of user space.

Furthermore, anti-malware module 110 may be configured to identify particular microsteps, e.g., aggregations of individual low-level transitions, reads, writes, executions, attribute changes, or I/O port attribute changes to be used for profiling code executions. The particular aggregations of transitions and accesses may be defined in malware-microstep rule logic 108. Example transitions are illustrated in FIG. 1 and may include: a transition 114 from a known portion of user space such as the user-portion "X" of the operating system in R7 to the tracked process in R5; a transition 124 from unidentified entities in kernel space in R4 to the tracked process in R5; a transition 122 from one unidentified entity in kernel space in R4 to another unidentified entity in kernel space in R3; a transition 118 from the tracked process in R4 to a known entity in kernel space such as SSDT in R1; a transition 116 from the tracked process in R4 to an unidentified entity in kernel space in R3; or a transition 120 from an unknown entity in kernel space in R2 to a known entity in kernel space such as SSDT in R1.

In addition, anti-malware module 110 may be configured to identify particular aspects of transitions for the purposes of profiling code executions. The particular aspects may be defined in malware-access rule logic 108. In one embodiment, the specific direction of a transition may be evaluated. For example, a transition between R1 to R2 may be distinguished from a transition between R2 to R1. Thus, malware-microstep rule logic 108 may require that a given transition in an aggregation of transitions that is defined a microstep is to be matched only in a specified direction. In another embodiment, the distance of a transition may be evaluated. For example, a transition from one memory space to a nearby memory space may be sufficiently short so as to represent a transition that is to be ignored. Thus, malware-microstep rule logic 108 may provide an exception for a transition if the transition is made across less than a threshold amount of memory addresses. Such a threshold may include, for example, fifty bytes. In yet another embodiment, a count of a transition may be evaluated. For example, a transition from one monitored region to another may be repeated multiple times, and only upon a certain number of such repeated transitions will the execution be deemed worthy of applying malware-microstep rule logic 108. Thus, malware-microstep rule logic 108 may specify that a transition is to be matched to a known microstep only upon an n-th time such a transition occurs. Previous or subsequent instances of such transitions may be ignored. In still yet another embodiment, conditionals may be placed upon transitions, such that logic, including NOT, AND, OR, XOR, or other such operations may be applied to one or more transitions. For example, a particular transition may indicate the presence of a particular microstep, as long as another, different kind of transition has not yet been encountered. Thus, malware-microstep rule logic 108 may specify conjugate or complex logical conditions for matching transitions.

Transitions such as transitions 114, 116, 118, 120, 122, and 124 may be defined as branches in execution between different regions of memory 104. In one embodiment, a jump in execution may be evaluated according to addresses loaded into an instruction pointer 112 of processor 106. Memory addresses of a given range loaded into instruction pointer 112 before execution may be compared to memory addresses of another given range loaded into instruction pointer 112 after execution. The change in memory ranges associated with instruction pointer 112 before and after execution may reflect a JMP instruction, a CALL instruction, or other instruction for branching execution between entities resident in memory 104. In another embodiment, reads, writes, or executions of memory addresses may define branches of execution, wherein subsequent reads, writes, or executions of memory that are in disparate portions of memory 104 may be considered transitions. In yet another embodiment, instruction fetching may be used to determine a point of execution in memory 104.

Timing and instruction counts may also be taken into account in malware-microstep rule logic 108. For example, if a time interval—such as that determining by a central processing unit counter—between two transitions is too long or too short then a given rule may not apply. Similarly, if an instruction counter is below or above a threshold then the state of matching a rule may be reset to an initial state.

While a single processor 106 is illustrated in FIG. 1, system may include multiple processors. Furthermore, processor 106 may include multiple cores or central processing units. Profile execution performed by system 100 may be conducted on a per-processor, per-core, or per-central processing unit basis. Furthermore, such profile execution may be conducted on a per-process or per-thread basis on any such processor, core, or central processing unit.

The illustration of code execution profiling with transitions in FIG. 1 is made with reference to contiguous memory. Such profiling may include profiling of entities as such entities are resident within virtual memory. In one embodiment, the profiling of code execution may be accomplished by reference to physical addresses underlying the virtual memory.

As described above, anti-malware module 110 may access malware-microstep rule logic 108 to determine any suitable number or kinds of transitions (or sequences of transitions) that are to be monitored. In one embodiment, rules, indications, or logic for such transitions that are to be monitored may be loaded into, for example, processor 106 or into a random-access-memory controller coupled to processor 106. Upon encountering such a transition defined by the rules, processor 106 may generate a page fault, interrupt, or an exception that may be handled by anti-malware module 110. In another embodiment, rules, indications, or logic for such transitions that are to be monitored may be loaded into a below-operating system trapping agent, such as a hypervisor or virtual machine monitor. Upon encountering such a transition (or sequences of transitions) defined by the rules, the hypervisor or virtual machine monitor may generate a virtual machine exit or other notification that may be handled by anti-malware module 110. Anti-malware module 110 may further access malware-microstep rule logic 108 to determine whether the detected transition (or sequences of transitions) are indicative of malware. During handling of the notification, execution may be paused.

The notification made by processor 106 that a rule has been matched may include context information. The information may include an identification of the rule that was matched, the memory location accessed, the memory location originating the access, and any associated parameters such as values resident on the execution stack of processor 106.

Anti-malware module 110 may be configured to track the occurrences of multiple detected transitions to determine whether such transitions include an operational pattern indicative of malware. Such patterns may be defined in, for example, malware-microstep rule logic 108. If the one or more detected transitions are not indicative of malware, anti-malware module 110 may be configured to allow the transition. If the one or more detected transitions may be indicative of malware pending additional determined transitions, anti-malware module 110 may be configured to allow the transition but record the transition for possible future corrective action.

Upon determining that one or more transitions are indicative of malware, anti-malware module 110 may be configured to take any suitable corrective action. For example, the entities in memory 104 associated with the transitions indicating malware may be quarantined, reported, removed, cleaned, or otherwise handled. Furthermore, anything associated with such entities, such as contents in storage or on disk, or other executing processes in memory may be quarantined, reported, removed, cleaned, or otherwise handled.

Certain interrupts or notifications may be defined according to a whitelist of malware-microstep rule logic 108. Placement of such interrupts or notifications into the whitelist may cause anti-malware module 110 to ignore such interrupts in terms of malware analysis. Such interrupts or notifications may be the result of, for example, known or safe elements of system 100 or may be unrelated to malware and thus require no handling by anti-malware module 110.

Figure 2:
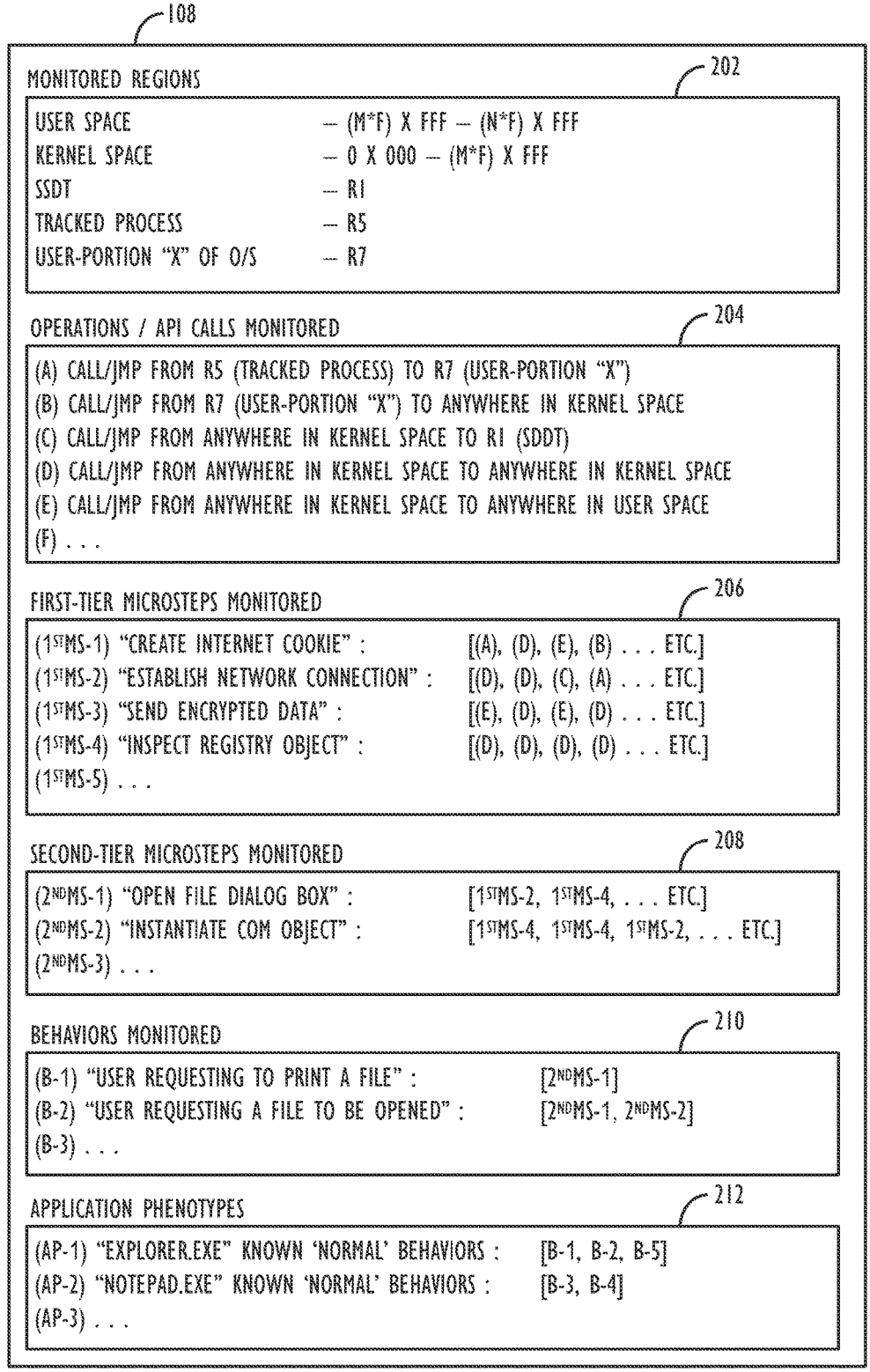
FIG. 2 is a block diagram illustrating exemplary malware microstep rules and application phenotype logic, according to one embodiment.

Turning now to FIG. 2, a block diagram is shown, illustrating exemplary malware microstep rules and application phenotype logic 108, according to one embodiment. Malware-microstep rule logic 108 may include monitored regions 202. Monitored regions 202 may define entities that are to be monitored. In one embodiment, monitored regions 202 may define memory ranges of memory 104 for which execution will be profiled by system 100. The memory ranges may be defined according to physical memory addresses or virtual memory addresses, as appropriate. The mapping of the memory ranges corresponding to a given entity may be defined according to, for example, anti-malware module 110 as it tracks the loading and unloading of elements of memory 104. In the example of FIG. 2, monitored regions 202 may define that user space and kernel space are to be monitored. Such monitored regions 202 may define that user space may be resident from addresses (M*F x FFF) through (N*F x FFF), and that kernel space may be resident from addresses (0x000) through (M*F x FFF). Specifically, elements may be defined in monitored regions 202, such as SSDT, a tracked process, and a user-portion "X" of an operating system. Although specific memory address ranges are not detailed in the example of FIG. 2, such addresses may be specified after they are determined. Furthermore, each such region may be given a unique identifier or otherwise labeled for reference by other rules. Kernel space and user space may be referenced as such. The space for SSDT may be denoted as R1, the space for the tracked process may be denoted as R5, and the space for the user-portion "X" of the operating system may be denoted as R7.

Malware-microstep rule logic 108 may include operations and API calls monitored 204, which may specify what transitions or other operations may require handling for malware evaluation. For reference by other of portions of malware-microstep rule logic 108, each of operations monitored 204 may be denoted by a unique identifier. The unique identifier may thus represent a state of operation in which the monitored operation has occurred. For example, a call, jump, or other branch from R5 (the tracked process) into R7 (the user portion "X") may be considered a transition and marked as state (A). A call, jump, or other branch from R7 (the user portion "X") to anywhere within the kernel space may be considered a transition and be marked as state (B). A call, jump, or other branch from anywhere in the kernel space to R1 (the SSDT) may be considered a transition and be marked as state (C). A call, jump, or other branch anywhere in the kernel space to anywhere else in the kernel space may be considered a transition and be marked as state (D). Such an event may be subject to a minimum distance requirement. A call, jump, or other branch anywhere in the kernel space to anywhere else in the user space may be considered a transition and be marked as state (E). The monitored operations may also include context from higher-level APIs, such as those to open file dialogs, create cookies, or perform a DNS lookup. This can be helpful because, e.g., it is easier to aggregate disparate operations into a single microstep if it is known that the application called an API to trigger the performance of the operations in question.

The specific operation which is monitored within each of operations monitored 204 may include any suitable operation. The operation may be specific to the type of entity. For example, such monitoring may include execution of certain entities in R5 or merely accessing data in the entities in R1.

Malware-microstep rule logic 108 may include First-tier microstep rules 206, which may specify how to classify a given sequence of encountered operations, such as those defined in operations monitored 204. Each of First-tier microstep rules 206 may be represented by, for example, an aggregation of low-level operations and higher-level contextual information delivered by APIs. For example, given detected operations (A), (D), (E), and (B), First-tier microstep rules 206 may indicate that such a detected sequence is representative of "Create Internet Cookie" microstep ($1^{st}$ MS-1). In one embodiment, the microstep rule logic may require the no other detected ones of operations monitored 204 to have appeared in addition to operations (A), (D), (E), and (B) in order for the operations to be classified as a "Create Internet Cookie" First-tier microstep. In another embodiment, the microstep may allow a certain amount of deviation or "tolerance" in the detection of operations that would be classified as a "Create Internet Cookie" First-tier microstep. In still other embodiment, the microstep may also take into consideration whether the sequence of operations were executed in response to an API call made to a particular program or library. The remaining First-tier microsteps ($1^{st}$MS-2)-($1^{st}$ MS-5) represent additional hypothetical First-tier microsteps that the system may be configured to recognize in response to a give sequence of encountered operations.

First-tier microstep rules 206 may thus specify behaviors of a general type, without relying upon signature identification of a particular entity as malware. Behaviors of polymorphic malware, which may change its own content (and consequently, signature) without its overall functionality, may thus be detected. Furthermore, unusual or unexpected patterns of operation may be detected. Such unusual or unexpected patterns of operation may reflect a new, unknown kind of malware. For example, a process may match a given prefix of a sequence of operation that otherwise may indicate operation of a trusted process, but then perform an atypical access for such a trusted process. In such cases, the process may not match any of the First-tier microstep rules 206, indicating that the sequence of operations may be indicative of malware.

Malware-microstep rule logic 108 may further include Second-tier microstep rules 208, which may specify how to classify a given sequence of encountered First-tier microsteps, such as those defined in First-tier microstep rules 206. Each of the Second-tier microstep rules 208 may be represented by, for example, an aggregation of First-tier microstep rules 206. For example, given detected First-tier microsteps ($1^{st}$MS-2) and ($1^{st}$MS-4) [and potentially others First-tier microsteps, if so desired], Malware-microstep rule logic 108 may be able to identify a Second-tier microstep, ($2^{nd}$MS-1), indicative of an "Open File Dialog Box" operation. As mentioned above, Second-tier microsteps may be used to further "up-level" more complex application behaviors and provide further tolerance in the underlying operations, while still being able to identify a sequence of underlying operations as a particular higher-level concept.

Malware-microstep rule logic 108 may still further include Behavior rules 210, which may specify how to classify a given sequence of encountered Second-tier microsteps, such as those defined in Second-tier microstep rules 208. Each of the Behavior rules 210 may be represented by, for example, an aggregation of Second-tier microstep rules 208. For example, given detected Second-tier microsteps ($2^{nd}$MS-1) and ($2^{nd}$MS-2) [and potentially others Second-tier microsteps, if so desired], Malware-microstep rule logic 108 may be able to identify a Behavior, (B-2), indicative of a "User Requesting a File to be Opened" behavior. Behaviors may be used to further "up-level" the combination of complex Second-Tier microsteps into common "use cases" or activities performed by an application operating under "normal" conditions (and to provide further tolerance in allowing for variations to the underlying operations, while still being able to identify a sequence of underlying operations as a particular higher-level behavior).

Finally, malware-microstep rule logic 108 may further include Application Phenotypes 212, which, as described above, may detail a list of "known" or "normal" behaviors that may be performed by a given application. As described above, each of the Behavior rules 210 may be represented by an aggregation of Second-tier microsteps 208, which may, in turn, be comprised of First-tier microsteps 206, which may, in turn, be comprised of individual operations and API calls detected by monitoring particular memory regions and transitions. As may now be more fully appreciated, the use of Application Phenotypes provides for tolerance at every level of detection (i.e., operation, First-tier microstep, Second-tier microstep, Behavior), which can help to limit the number of false positives identified by the malware system and provide the system with further robustness in making the determination of "normal" versus "abnormal" behavior, without reference to the actual content or signature or any particular process. For example, Application Phenotype (AP-1) may refer to the "Explorer.exe" application, and may define behaviors B-1, B-2 and B-5 as being normal behaviors that the "Explorer.exe" application exhibits "in the wild." Thus, when an abnormal behavior is detected for a given application (i.e., a behavior that is not part of that application's phenotype), the system may flag the behavior for further intervention, or stop the behavior from occurring outright.

Figure 3:
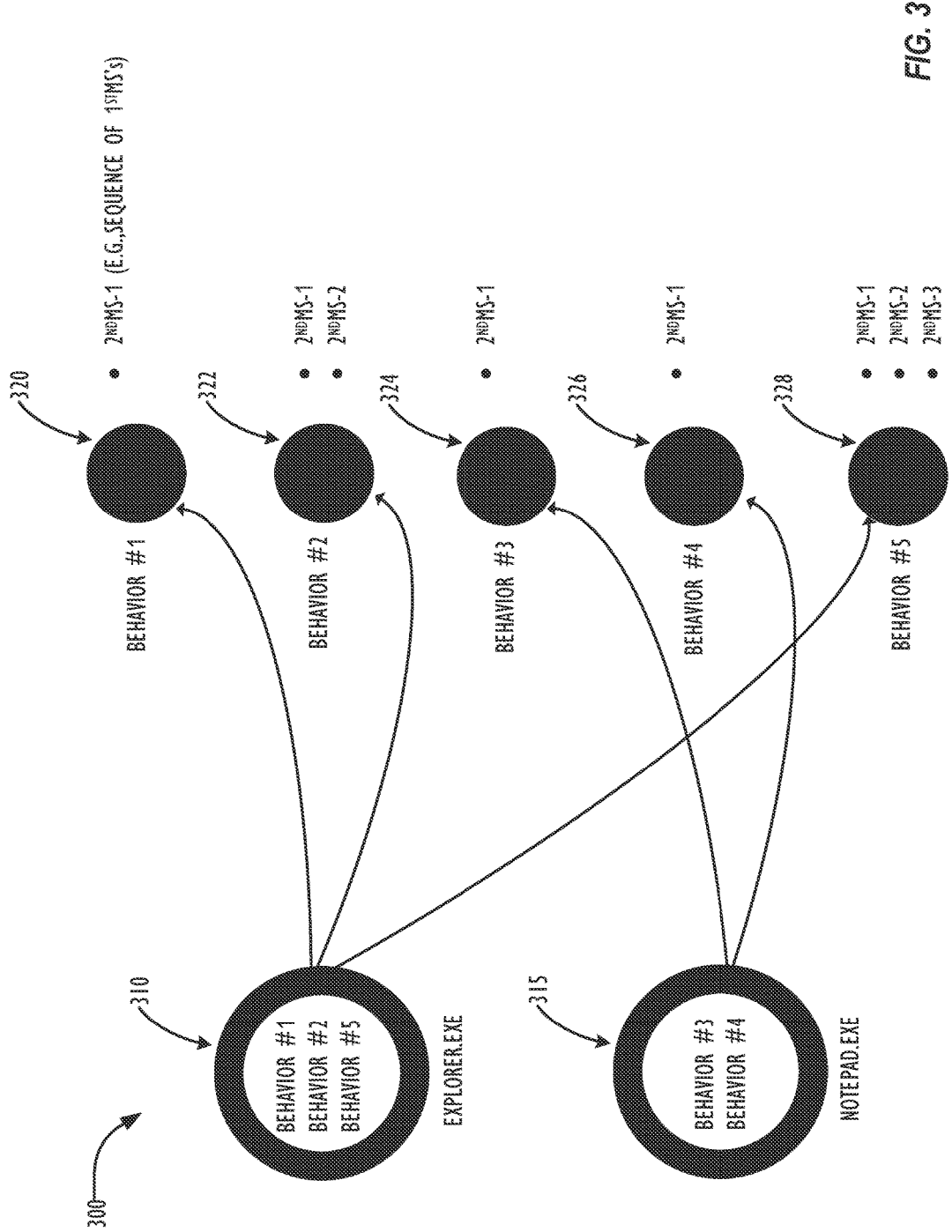
FIG. 3 is a diagram illustrating the relationships between exemplary applications, application phenotypes, and individual behaviors, according to one embodiment.

FIG. 3 is a diagram 300 illustrating the relationships between exemplary applications, application phenotypes, and individual behaviors, according to one embodiment. Applications Explorer.exe 310 and Notepad.exe 315 are represented by the two larger rings. Within ring 310 for Explorer.exe are Behaviors #1, #2, and #5, indicating that these behaviors are a part of the application phenotype for Explorer.exe. Likewise, within ring 315 for Notepad.exe are Behaviors #3 and #4, indicating that these behaviors are a part of the application phenotype for Notepad.exe. Further, the individual behaviors 320/322/324/326/328 are shown as being comprised of various Second-tier microsteps. While not shown as such, it is possible for multiple applications to share the same behaviors as one another. Recall that, as stated earlier, each Second-tier microstep may itself be comprised of one or more First-tier microsteps, which are in turn recognized by the system monitoring a particular aggregation or sequence of lower-level operations in the system.

Figure 4:
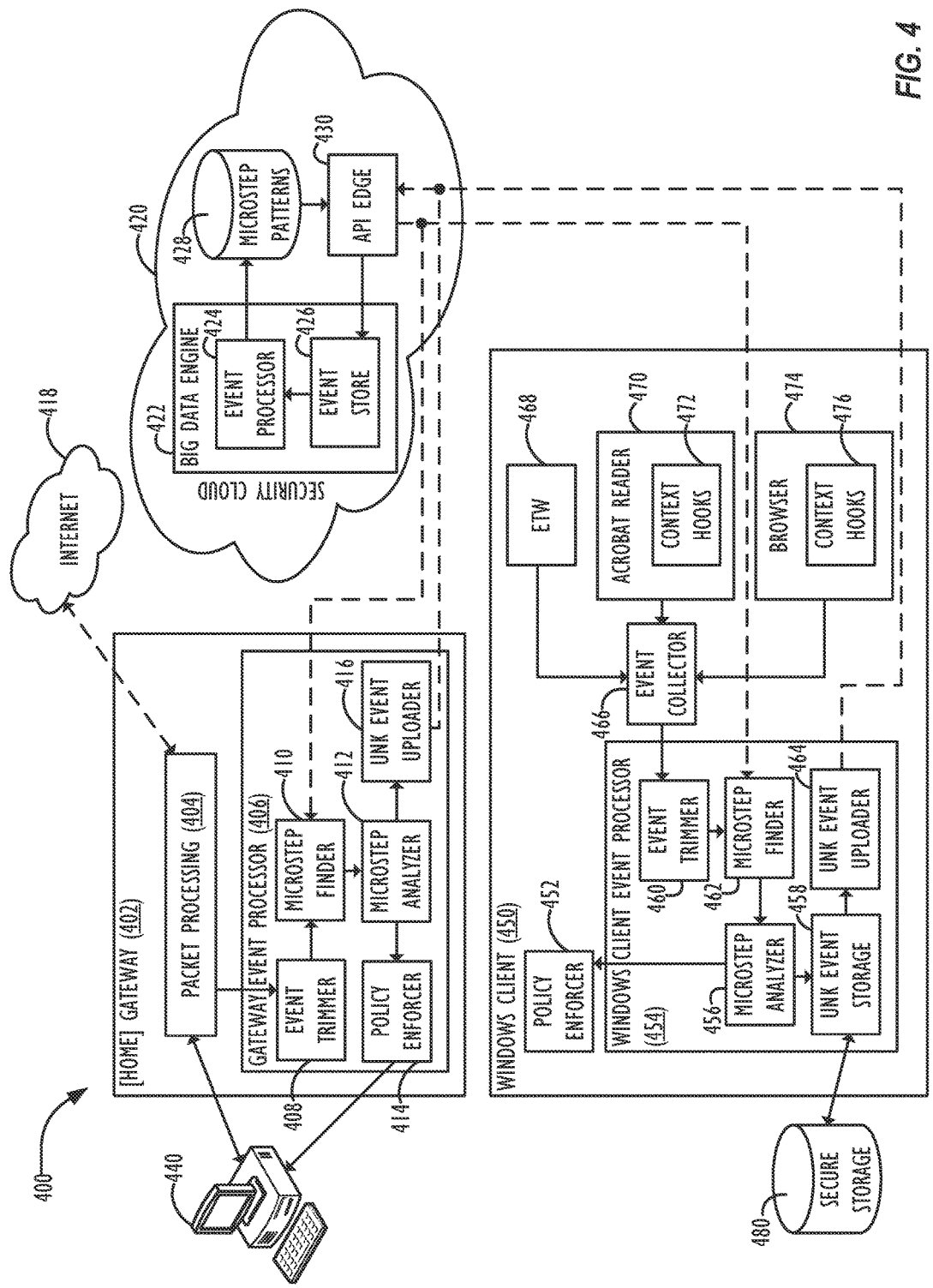
FIG. 4 is a block diagram illustrating a computer-implemented system for building and maintaining application phenotypes, according to another embodiment.

FIG. 4 is a block diagram 400 illustrating a computer-implemented system for building and maintaining application phenotypes, according to another embodiment. First, security cloud 410 represents the aforementioned central device for aggregating and parsing the monitored event data from the end points monitored by the malware detection system. Security cloud 410 may comprise a "Big Data" engine 422, which in turn may comprise an event store 426 for storing all of the monitored events and microsteps observed at the monitored end points and event processor 424 for attempting to parse and glean useful information from the captured event data, e.g., the determination of existing microsteps/behaviors/phenotypes and/or the discovery of new microsteps/behaviors/phenotypes in the collected data. Once the Big Data engine 422 has determined or discovered new microsteps/behaviors/phenotypes, they may be stored in microstep patterns database 428 and pushed/pulled to and from end points via API edge 430.

End point device 440 represents an end user's computer, e.g., a desktop computer, mobile device, tablet device, etc. that is utilizing the malware protection system. As mentioned above, in some embodiments, monitoring may be performed by a home gateway device 402, rather than all processing being done by a central security cloud 420 or a client application running on the end point device itself. Thus, in addition to performing packet processing 404 to and from the Internet 418, home gateway 402 may also comprise a gateway event processor 406 for processing the various events (i.e., operations) monitored by the device. Gateway event processor 406 may comprise an event trimmer 408 for parsing out irrelevant or unimportant collected event data. The data from the event trimmer 408 may then be sent to the microstep finder 410, e.g., employing the malware-microstep rule logic 108 to see if any known microsteps may be located in the event data. Any located microsteps may then be passed to the microstep analyzer 412 to determine if any known behaviors may be determined. If the sequence of microsteps determined does not relate to a known behavior, they may eventually be uploaded by unknown event uploader 416 to the security cloud 420 via the API edge 430. If, instead, the microstep analyzer recognizes the determined microsteps as an abnormal behavior, a security policy may be enforced by policy enforcer 414. Policy enforcer module 414 may receive one or more identified behaviors from the event processor 406 and determine whether each of the one or more identified behaviors are abnormal, e.g., indicative of malware, based, at least in part, on comparisons to: a phenotype of the client application running on the end point device that caused the respective identified behavior to occur; a phenotype for one or more other trusted applications (e.g., one that is not running on the end point device); and a phenotype for one or more known malware applications. For example, in some embodiments, the policy enforcer module may be configured to determine that an identified behavior is indicative of malware when the phenotype of the application that caused the identified behavior to occur does not comprise the identified behavior, and the phenotype of the one or more trusted applications does not comprise the identified behavior. In other embodiments, the policy enforcer module may also be configured to determine that an identified behavior is indicative of malware when the phenotype of one or more known malware applications comprises the identified behavior.

As mentioned above, system 400 may also comprise individual Windows client devices 450 that are running their own application phenotyping malware detection software. Client 450 may thus comprise an event collector 466 in communication with ETW 468, and with context hooks 472/476 into various applications, such as Acrobat Reader 470 or Browser 474. The various events and operations collected by event collector 466 may then be passed to the Windows Client Event Processor 454. The makeup of Windows Client Event Processor 454 may be similar to that of Gateway Event Processor 406 described above (i.e., comprising Event Trimmer 460, Microstep Finder 462, Microstep Analyzer 456, Unknown Event Storage 458, and Unknown Event Uploader 464). However, in addition to uploading unknown event data to the Security Cloud 420 with the Unknown Event Uploader 466, the Windows Client Event Processor 454 may also store the unknown event data in Unknown Event Storage 458, which may comprise a Secure Storage device 480.

The architecture of system 400 highlights several key aspects of certain embodiments of the application phenotyping system. First, a centralized, cloud-based storage and processing may be used for microstep generation (APIs exist to deliver microsteps to user end points in the appropriate data formats). Second, for closed operating systems where the central device has no access, microsteps may be built out based on an individual network (these systems could also include industrial computers that are part of the so-called Internet of Things (IOTs), hence the home gateway 402 is shown as potentially doing some microstep analysis. Third, in the classic home end-user Windows client example, where there is typically quite heavy data collection on all of the different kernel access, API usage, etc., fronts, the microstep analysis may be performed "on-box" (i.e., on the Windows device), as opposed to anywhere else. In larger systems with, e.g., those with millions of events, sending all of the events to a central device for analysis will not scale well. To relieve some of this stress, the clients on user end points could instead upload their microstep data at predetermined time intervals, e.g., every 8 hours. As microsteps are discovered "in the wild" by a given end point in the event streams from all the monitored applications, there may end up being a large number of "unknown" microsteps. These unknown microsteps could either by an indication of something malicious, or they could simply indicate that, in the wild, there is software that is doing completely benign—but very 'different'—behavior. When this information is reported back to the central device, it may be an indication that a new microstep(s) should be built. Periodically, end points could upload all its microstep detection data, along with metrics, to indicate usefulness of this approach and how the device is performing. In an ideal implementation the microstep templates and other information is downloaded over a secured connection, so that it may be ensured that the end points are operating on a correct data set.

Figure 5:
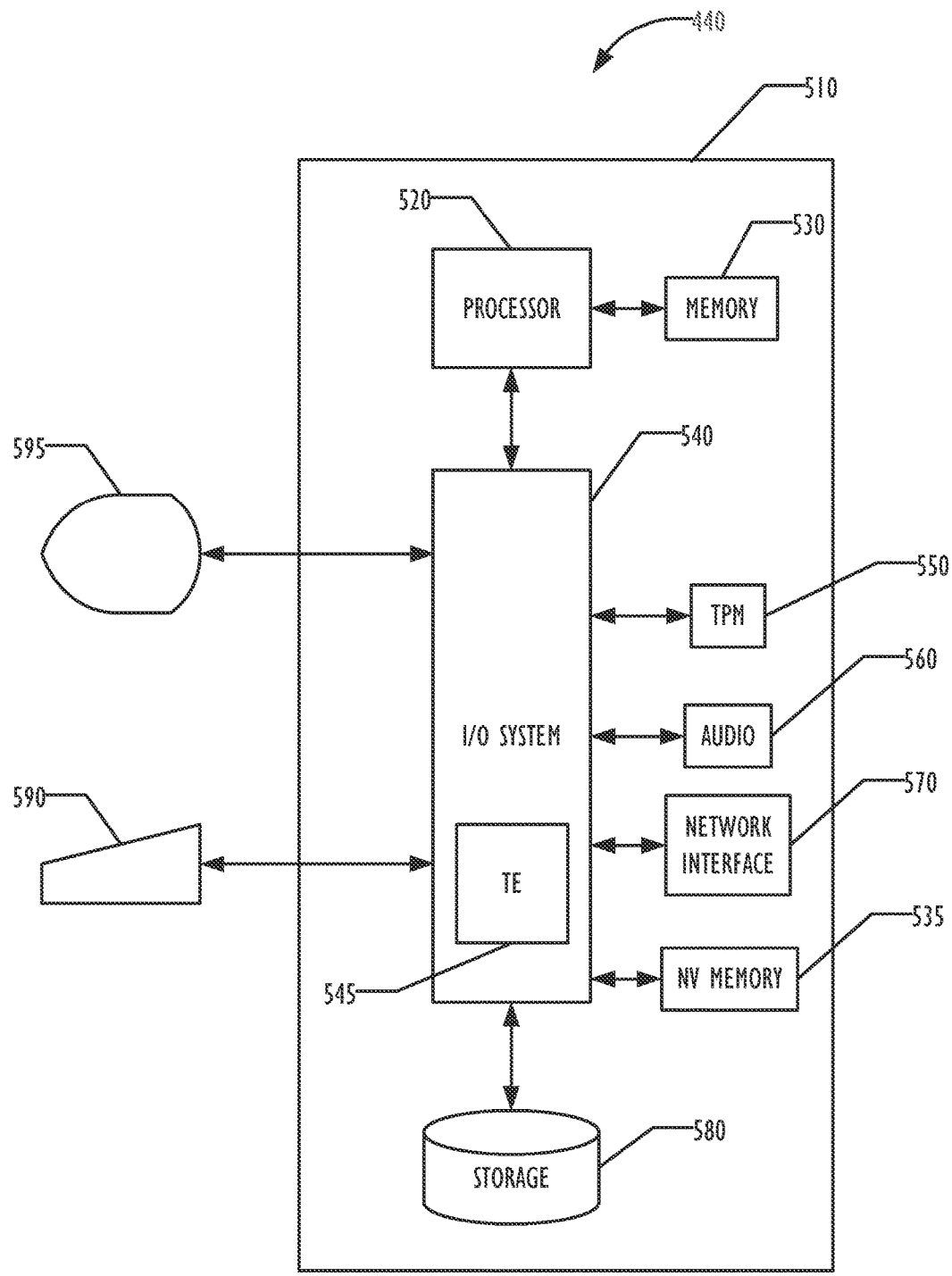
FIG. 5 is a block diagram illustrating a computer system for detecting malware or other anomalies, according to another embodiment.

FIG. 5 is a block diagram illustrating a computer system 500 that may be used to implement some or all of the techniques described herein. A system unit 510 provides a location where components of the computer system 500 may be mounted or otherwise disposed. The system unit 510 may be manufactured as a motherboard on which various chipsets are mounted, providing electrical connection between the components and signal and power distribution throughout the system unit 510 and external to the system unit 510 as desired. For example, the computer system 500 may include an output device such as display 595, which provides a way to display alerts or other indications that the anti-malware system has detected the possibility of an anomaly by examining hardened platform counters.

Figure 6:
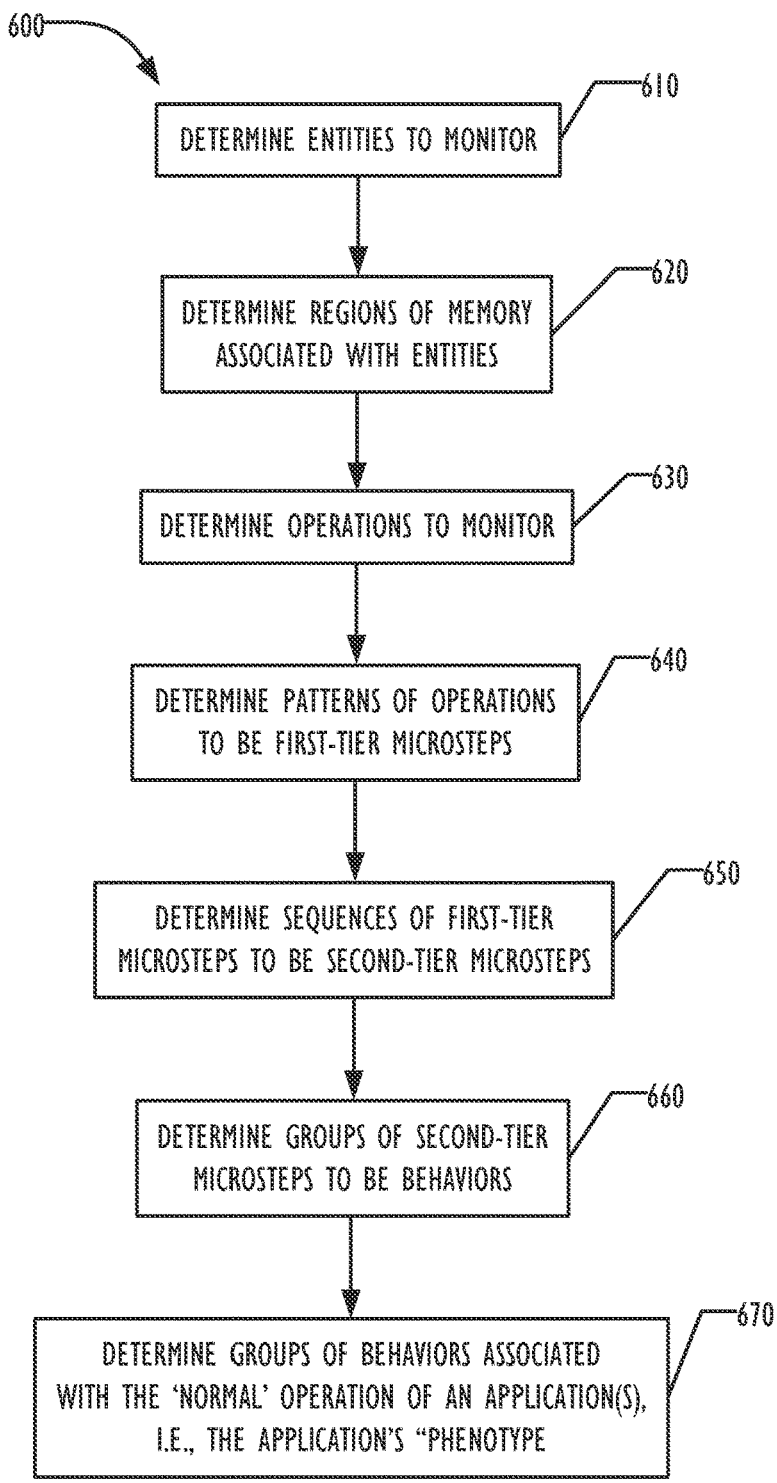
FIG. 6 is a flowchart illustrating a technique for building application phenotypes, according to one embodiment.
Figure 7:
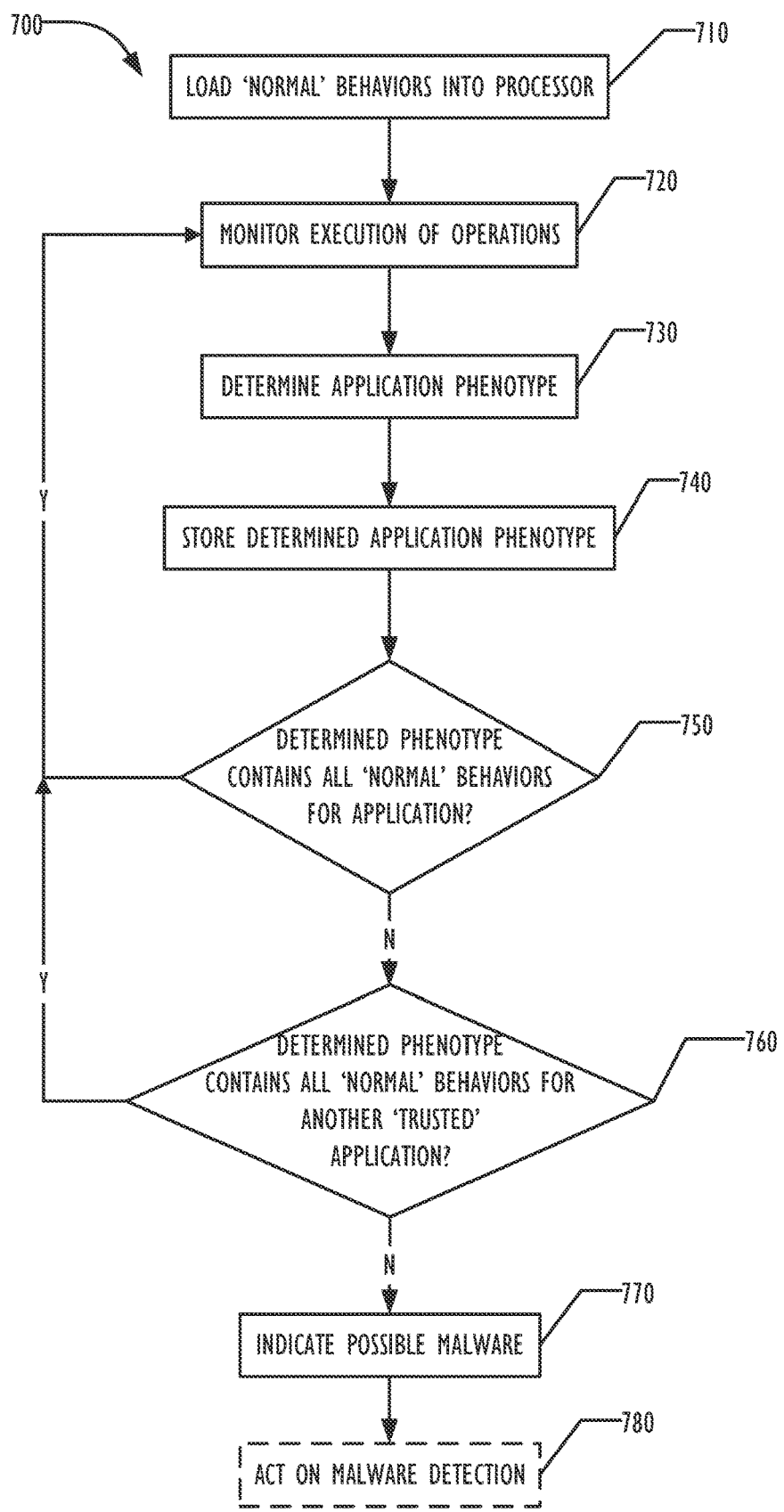
FIG. 7 is a flowchart illustrating a technique for detecting malicious behavior, according to one embodiment.

Various components of the system unit 510 may include one or more processor 520, typically each a single processor chip mounted in a mounting socket (not shown in FIG. 5) to provide electrical connectivity between the processors 520 and other components of the computer 500. Although a single processor 520 is illustrated in FIG. 5, any desired number of processors can be used, each of which may be a multi-core processor. Multiple processor chips are available on the market currently, and any desired processor chip or chipset may be used. The system unit 510 may be programmed to perform methods in accordance with this disclosure, an example of which is illustrated in FIGS. 6 and 7.

The processor 520 is connected to memory 530 for use by the processor 520, typically using a link for signal transport that may be a bus or any other type of interconnect, including point-to-point interconnects. Memory 530 may include one or more memory modules and comprise random access memory (RAM), read only memory (ROM), programmable read only memory (PROM), programmable read-write memory, and solid-state memory. The processor 520 may also include internal memory, such as cache memory. An operating system running on the processor 520 generally controls the operation of the computer system 500, providing an operating system environment for services, applications, and other software to execute on the computer 500.

As illustrated in FIG. 5, processor 520 is also connected to a I/O subsystem 540 that provides I/O, timer, and other useful capabilities for the computer system 500. For example, the I/O subsystem 540 may provide I/O ports for connecting an optional display 595 and an optional input device 590, such as a keyboard, mouse, touch screen, to the system unit 510. The ports may be either one or more of special-purpose ports for components like the display 595 or multipurpose ports such as Universal Serial Bus (USB) ports for connecting a keyboard or mouse 590. The I/O subsystem 540 may also an interface for communicating with storage devices such as storage device 580, connect to audio devices through an audio interface 560, and connect to a network via network interface 570. The storage device 580 represents any form of non-volatile storage including, but not limited to, all forms of optical and magnetic, including solid-state storage elements, including removable media, and may be included within system unit 510 or be external to system unit 510. Storage device 580 may be a program storage device used for storage of software to control computer 500, data for use by the computer 500 (including network flow data), or both. Although only a single storage device 580 is illustrated in FIG. 5 for clarity, any number of storage devices 580 may be provided as desired, depending on interface availability. The I/O subsystem 540 may be implemented as one or more chips within the system unit 510. In some embodiments, the memory 530 may be connected to the I/O subsystem 540 instead of to the processor 520.

In addition, some embodiments may connect the I/O subsystem 540 to a Trusted Platform Module 550 that provides a cryptoprocessor for storing cryptographic keys to protect information. Embodiments may implement the functionality of the I/O subsystem 540 as one or more separate chips in the system unit 510.

As illustrated in FIG. 5, the I/O subsystem 540 provides hardware resources for the secure trusted environment (TE) 545. The TE 545 provides a secure environment not controlled by the operating system that controls the computer 500. In other embodiments, the TE 545 may be outboard of the I/O subsystem as a separate chipset, or may be incorporated in the processor 520, such as a separate core restricted to TE functionality. The TE 545 contains secure processing functionality that allows performing the secure environment side in a trusted environment that cannot be interfered with by malware—even malware that may run as a bootkit or rootkit on processor 520. Typically, vendors providing the TE 545 use proprietary or cryptographic techniques to ensure control over what functionality may execute in the TE 545, preventing execution of any but carefully vetted trusted programs to run in the TE 545. Special interfaces may be provided to allow software running on the processor 520 to request the TE 545 to perform desired functionality or providing data from the TE 545 to the processor 520 for analysis. The TE 545 may either use its own internal memory or use a portion of the memory 530 for data and firmware storage. Alternatively, instructions in the form of firmware for execution in the TE 545 may be loaded from a non-volatile memory device 545, such as a flash memory, upon powering up of the computer 500, and then loaded into a portion of the memory 530 for execution by the TE 545. In some embodiments, the TE 545 may be disabled and enabled as desired. These instructions may cause the TE 545 to perform the desired functionality. An example of a trusted environment that may be used for these techniques is the Manageability Engine (ME) in certain chipsets provided by INTEL® Corp. Although described herein generally in terms of a hardware-based TE 545, secure environments, e.g., the Intel® SGX type of TE, may be implemented in hardware, firmware, or software, or any combination thereof, as desired.

The computer system 500 may be any type of computing device, such as, for example, a smart phone, smart tablet, personal digital assistant (PDA), mobile Internet device (MID), convertible tablet, notebook computer, desktop computer, server, or smart television. The display 595, if present, may be any time of device for presenting an interface to the user, such as, for example, a touch screen or a liquid crystal display. The elements illustrated in FIG. 5 are illustrative and given by way of example only. The elements shown in FIG. 5 may be combined or divided into multiple elements as desired. Other elements, such as geo-positioning logic provided by a Global Positioning System (GPS) transceiver, as well as logic for handling mobile communications using standards such as, for example, IEEE 802.11, IEEE 802.16, WiMax, etc., may also be provided as desired.

FIG. 6 is a flowchart illustrating a technique 600 for building application phenotypes, according to one embodiment. At Step 610, entities of an electronic device to be monitored may be determined. Such entities may include, for example, kernel space, user space, an SSDT, an operating system call dispatcher, system DLLs, user DLLs, processes, I/O ports, heaps, threads, or a system stack. At Step 620, regions of memory associated with such entities may be determined as such entities reside on the electronic device. At Step 630, operations upon the regions of memory and entities may be determined to be monitored. Such operations may include, for example: jumps, calls, or other branches of execution. The operations may be defined directionally, from one memory region to another. At Step 640, patterns of the operations to be monitored may be determined. Such patterns may specify particular orders of the operations through commands, logic, or state machines. The patterns may represent, for example, one or more First-tier microsteps. At Step 650, particular patterns or sequences of First-tier microsteps may be recognized and determined to be one or more Second-tier microsteps. At Step 660, particular patterns or sequences of Second-tier microsteps may be recognized and determined to be one or more behaviors. Finally, at Step 670, one or more behaviors may be associated with the "normal" operations of an application, i.e., an application's phenotype.

The determinations made by method 600 (e.g., as to what entities to monitor, what patterns represent microsteps, what microsteps represent behaviors, etc.) may be performed by, for example: anti-malware research; profiling a specific electronic device or entities thereof; profiling a class of electronic device or entities thereof; accessing an anti-malware server; accessing anti-malware rule logic; reading anti-malware definition files; or through any other suitable process. The result of method 600 may be the availability of one or more "application phenotype" rules by which code execution may be profiled.

FIG. 7 is a flowchart illustrating a method 700 for detecting malicious behavior, according to one embodiment. As discussed above with reference to FIG. 4, the method 700 may be performed by any number of central devices, e.g., a home gateway device, a Windows (or other OS) client device, and/or in the cloud by a network-accessible server. At Step 710, the central device that will be performing the application phenotype processing may begin by loading the "normal" behaviors associated with a particular application (e.g., those behaviors identified by method 600 of FIG. 6) into a processor memory space. At Step 720, the central device may begin to monitor the live operations taking place on the monitored device (e.g., using the techniques outlined with reference to FIG. 2 and FIG. 6). At Step 730, the central device may combine all the monitored operations into tiered aggregations of microsteps and behaviors in order to determine a phenotype for the application. At Step 740, the central device may store the application phenotype, either to analyze 'on site' or to upload to a 'security cloud,' e.g., security cloud 420 with big data engine 422, for further analysis. At Step 750, it may be determined by the central device whether the determined application phenotype from Step 730 contains all normal behaviors for the respective application. If all behaviors monitored are "normal" (within a threshold level, as will be discussed below), the process may return to Step 720 to continue monitoring the execution of operations on the monitored device(s). If, instead, all the behaviors monitored are not "normal" (within a threshold level, as will be discussed below), the process may proceed to Step 760 to determine, by the central device, whether the determined application phenotype from Step 730 contains all normal behaviors for the another 'trusted' application (i.e., an application that is known to not be malware). If all behaviors monitored are "normal" (within a threshold level, as will be discussed below) for some other 'trusted' application, the process may likewise return to Step 720 to continue monitoring the execution of operations on the monitored device(s). If, instead, there are monitored behaviors monitored that are not "normal" to the application (or any other trusted application), or, indeed, if there are monitored behaviors that affirmatively match (within a threshold level) the behaviors of a known malware application, the process may proceed to Step 770 to indicate a possible malware process has been identified and then optionally act on the detected malware process at Step 780. In some embodiments, the process may determine that a particular behavior is indicative of malware by determining a confidence score based on the comparisons of the particular behavior to each of: the phenotype for the particular application, the phenotype for one or more trusted applications, and the phenotype for the one or more known malware applications. By combining these comparisons, e.g., using a weighting scheme, a single confidence score may be determined that is used for the ultimate determination of whether or not the particular behavior is indicative of a malware process present on the monitored device. E.g., in some embodiments, whether a behavior matches with the behavior of a known malware application may be given more weight (and thus ultimately cause the confidence score to indicate a possible malware process) than a determination that a behavior matches a behavior of another trusted application. In still other embodiments, whether a behavior matches with the normal behavior of the particular application may be given more weight (and thus ultimately determine whether the confidence score indicates a malware process) than a determination that a behavior matches a behavior of some other trusted application.

With respect to the determinations made at Step 750 and Step 760 with regard to whether or not an observed application phenotype contains all "normal" behaviors, method 700 may employ one or more scoring techniques to develop a reputation and/or confidence score that an observed behavior matches a known, normal behavior for a given application. For the scoring process, the method may consider traces from, e.g.: within an entire enterprise; only on the device in question; or across all devices globally, etc. The scoring process may compare the observed results with one, many, or all of the above sets of devices to determine how much the observed results deviate from known behaviors. For example, a scoring process may consider whether an observed behavior is a deviation from behaviors that have previously been observed on the same device and assign that a first weighting value, w1. It may then consider whether an observed behavior is a deviation from behaviors that have previously been observed within the device's enterprise and assign that a second weighting value, w2. It may then consider whether an observed behavior is a deviation from behaviors that have previously been observed across all devices globally and assign that a third weighting value, w3. All of these weights and scores may then be taken into account when determining if an observed behavior is truly "abnormal." For example, an exemplary combined score could be determined according to the following formula: (w1*DEVICE_SCORE)+(w2*ENTERPRISE_SCORE)+ (w3*GLOBAL_SCORE). Each of the weights for these three classes of scores could be independently varied based on a particular system, environment, or microstep, etc. If the score (or combined score) for an exemplary process then differed from a "normal" behavior by a threshold amount, the process(es) may be deemed "abnormal." and the method may proceed to Step 760 to indicate the presence of potential malware.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

As described above, malware may make changes to itself so as to disguise its identity. Furthermore, malware authors may make changes to malware to disguise itself. Changing the contents of malware may lead to a change in a digital hash or signature of the malware. Consequently, checking the identities of entities on the electronic device against a list of known malware signatures may not identify such changed malware. Code or execution analysis of static code may similarly be ineffective, as the code may change in such polymorphic malware.

An advantage of system 400 and methods 600 and 700 may include detecting such modified malware. Such detection may be performed by providing reliable detection of the underlying behaviors (and sequences of behaviors) being carried out by the malware. Furthermore, system 400 and methods 600 and 700 may provide such dynamic profiling of execution that is resilient to small or insignificant deviations in behaviors and/or sequences of behaviors. Thus, systems and methods described herein may be able to detect the presence of malware—even if the malware is performing an allowable operation for a given application—e.g., in the event that the sequence of events leading up to the performing of the allowable operation was abnormal in some manner. Because the solutions described herein may also be considered content-less or "content agnostic," they do not need to ship to end users loaded with a number of malware-program specific information. Instead, they may build up a profile of "normal" operations for machines running in a "clean" environment and then simply detect deviations from those operations. Such deviations may be harmless, or they may, in fact be, harmful; the important aspect is that they are simply flagged as "abnormal" in a content-less fashion for further review.

The following examples pertain to further embodiments.

Example 1 is a malware detection system, comprising: a memory; a malware-microstep rule logic module, configured to: identify a plurality of regions to be monitored on a first device; identify one or more operations between the regions to be monitored; identify one or more microsteps, each microstep comprising an aggregation or sequence of operations that represent a higher-level function; identify one or more behaviors, each behavior comprising an aggregation or sequence of microsteps that represent a normal activity performed by a first application executing on the first device; identify a phenotype for the first application, the phenotype comprising each of the one or more behaviors identified for the first application; and store the identified phenotype in the memory; a processor configured to, based upon the malware-microstep rule logic, generate a notification that the first application has caused one or more of the operations to occur on the first device; and an anti-malware module configured, based on the notification and the one or more operations that the first application caused to occur, to: determine a first behavior performed by the first application; compare the first behavior to the phenotype for the first application; compare the first behavior to a phenotype for one or more trusted applications, wherein the phenotype for a trusted application comprises one or more behaviors identified for the respective trusted application, and wherein the one or more trusted applications are different applications from the first application; compare the first behavior to a phenotype for one or more known malware applications, wherein the phenotype for a known malware application comprises one or more behaviors identified for the respective known malware application, and wherein the one or more known malware applications are different applications from the first application; and determine whether the first behavior is indicative of malware based, at least in part, on the comparisons of the first behavior to: the phenotype for the first application, the phenotype for the one or more trusted applications, and the phenotype for the one or more known malware applications.

Example 2 includes the subject matter of example 1, wherein the determination whether the first behavior is indicative of malware comprises determining a confidence score based on the comparisons of the first behavior to: the phenotype for the first application, the phenotype for the one or more trusted applications, and the phenotype for the one or more known malware applications.

Example 3 includes the subject matter of example 1, wherein the malware detection system is located on the first device.

Example 4 includes the subject matter of example 1, wherein the malware detection system is communicatively coupled to the first device over a network.

Example 5 includes the subject matter of example 1, wherein the determination that a first behavior was performed by the first application further comprises: comparing the one or more operations that the first application caused to occur with one or more known behaviors using a confidence score; and determining that the confidence score associated with the comparison to the first behavior from among the one or more known behaviors is above a threshold amount.

Example 6 includes the subject matter of example 5, wherein the determination that a first behavior was performed by the first application further comprises comparing the one or more operations that the first application caused to occur with: one or more known behaviors performed on the first device; one or more known behaviors performed on devices within the same enterprise as the first device; and one or more known behaviors performed on all devices monitored by the system.

Example 7 includes the subject matter of example 6, wherein the confidence score is determined by independently weighting the comparisons to the one or more known behaviors performed on: the first device; devices within the same enterprise as the first device; and all devices monitored by the system.

Example 8 is a method for performing malware detection, comprising: identifying a plurality of regions to be monitored on a first device; identifying one or more operations between the regions to be monitored; identifying one or more microsteps, each microstep comprising an aggregation or sequence of operations that represent a higher-level function; identifying one or more behaviors, each behavior comprising an aggregation or sequence of microsteps that represent a normal activity performed by a first application executing on the first device; identifying a phenotype for the first application, the phenotype comprising each of the one or more behaviors identified for the first application: storing the identified phenotype in a memory; generating a notification that the first application has caused one or more of the operations to occur on the first device; determining, based on the notification and the one or more operations that the first application caused to occur, that a first behavior was performed by the first application; comparing the first behavior to the phenotype for the first application; comparing the first behavior to a phenotype for one or more trusted applications, wherein the phenotype for a trusted application comprises one or more behaviors identified for the respective trusted application, and wherein the one or more trusted applications are different applications from the first application; comparing the first behavior to a phenotype for one or more known malware applications, wherein the phenotype for a known malware application comprises one or more behaviors identified for the respective known malware application, and wherein the one or more known malware applications are different applications from the first application; and determining whether the first behavior is indicative of malware based, at least in part, on the comparisons of the first behavior to: the phenotype for the first application, the phenotype for the one or more trusted applications, and the phenotype for the one or more known malware applications.

Example 9 includes the subject matter of example 8, wherein the determination whether the first behavior is indicative of malware comprises determining a confidence score based on the comparisons of the first behavior to: the phenotype for the first application, the phenotype for the one or more trusted applications, and the phenotype for the one or more known malware applications.

Example 10 includes the subject matter of example 8, wherein the determination that a first behavior was performed by the first application further comprises: comparing the one or more operations that the first application caused to occur with one or more known behaviors using a confidence score; and determining that the confidence score associated with the comparison to the first behavior from among the one or more known behaviors is above a threshold amount.

Example 11 includes the subject matter of example 10, wherein the determination that a first behavior was performed by the first application further comprises comparing the one or more operations that the first application caused to occur with: one or more known behaviors performed on the first device; one or more known behaviors performed on devices within the same enterprise as the first device; and one or more known behaviors performed on all devices monitored by the system.

Example 12 includes the subject matter of example 11, wherein the confidence score is determined by independently weighting the comparisons to the one or more known behaviors performed on: the first device; devices within the same enterprise as the first device; and all devices monitored by the system.

Example 13 includes the subject matter of example 8, wherein a phenotype is identified each time an application is launched.

Example 14 includes the subject matter of example 8, wherein the memory is in a location remote to the first device.

Example 15 is at least one non-transitory machine-readable storage medium, comprising computer-executable instructions carried on the computer readable medium, the instructions readable by a processor, the instructions, when read and executed, for causing the processor to: determine, based on one or more operations that a first application caused to occur on a first device, that a first behavior was performed by the first application; compare the first behavior to a phenotype for the first application; compare the first behavior to a phenotype for one or more trusted applications, wherein the phenotype for a trusted application comprises one or more behaviors identified for the respective trusted application, and wherein the one or more trusted applications are different applications from the first application; compare the first behavior to a phenotype for one or more known malware applications, wherein the phenotype for a known malware application comprises one or more behaviors identified for the respective known malware application, and wherein the one or more known malware applications are different applications from the first application; and determine whether the first behavior is indicative of malware based, at least in part, on the comparisons of the first behavior to: the phenotype for the first application, the phenotype for the one or more trusted applications, and the phenotype for the one or more known malware applications.

Example 16 includes the subject matter of example 15, wherein determination whether the first behavior is indicative of malware comprises determining a confidence score based on the comparisons of the first behavior to: the phenotype for the first application, the phenotype for the one or more trusted applications, and the phenotype for the one or more known malware applications.

Example 17 includes the subject matter of example 15, wherein the instructions to determine that a first behavior was performed by the first application further comprise instructions to: compare the one or more operations that the first application caused to occur with one or more known behaviors using a confidence score; and determine that the confidence score associated with the comparison to the first behavior from among the one or more known behaviors is above a threshold amount.

Example 18 includes the subject matter of example 17, wherein the instructions to determine that a first behavior was performed by the first application further comprise instructions to compare the one or more operations that the first application caused to occur with: one or more known behaviors performed on the first device; one or more known behaviors performed on devices within the same enterprise as the first device; and one or more known behaviors performed on all devices monitored by the system.

Example 19 includes the subject matter of example 18, wherein the confidence score is determined by executing instructions to independently weight the comparisons to the one or more known behaviors performed on: the first device; devices within the same enterprise as the first device; and all devices monitored by the system.

Example 20 includes the subject matter of example 15, wherein the instructions further comprise instruction to identify a phenotype each time an application is launched.

Example 21 includes the subject matter of example 15, wherein the memory is in a location remote to the first device.

Example 22 is a device, comprising: a memory; one or more processors configured to execute instructions stored in the memory, the instructions comprising: an event processor module, configured to: receive a plurality of collected events; identify one or more microsteps from among the plurality of collected events, each microstep comprising an aggregation or sequence of collected events that represent a higher-level function; identify one or more behaviors, each behavior comprising an aggregation or sequence of microsteps that represent an activity performed by an application executing on the device; and determine whether each of the one or more identified behaviors are known or unknown; and a policy enforcer module, configured to: receive the one or more identified behaviors from the event processor module; and determine whether each of the one or more identified behaviors are indicative of malware based, at least in part, on: a phenotype of an application that caused the respective identified behavior to occur, a phenotype for one or more trusted applications; and a phenotype for one or more known malware applications, wherein the phenotype of an application comprises one or more normal behaviors for the respective application.

Example 23 includes the subject matter of example 22, wherein the event processor module is further configured to store unknown identified behaviors in a secure storage location communicatively coupled to the device.

Example 24 includes the subject matter of example 22, further comprising an event collector configured to monitor memory operations occurring on the device.

Example 25 includes the subject matter of example 22, wherein the policy enforcer module is further configured to determine that an identified behavior is indicative of malware when: the phenotype of the application that caused the identified behavior to occur and the phenotype of the one or more trusted applications do not comprise the identified behavior; or the phenotype of the one or more known malware applications does comprise the identified behavior.

Example 26 is a computer system comprising: means for performing the method of any one of claims 8-14.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An application phenotyping system, the application phenotyping system comprising:
   one or more processors; and
   a memory including instructions that, when executed, cause the one or more processors to:
   determine two or more first-tier rules, respective ones of the two or more first-tier rules referencing a corresponding sequence of two or more operations to be performed by one or more applications to be executed on one or more devices;
   identify second-tier rules, respective ones of the second-tier rules including a corresponding sequence of at least two of the first-tier rules;
   identify one or more behaviors including a third sequence of at least two of the second-tier rules, the one or more behaviors to represent one or more normal activities to be performed by the one or more applications;
   identify a phenotype for the one or more applications, the phenotype including one or more of the behaviors, the phenotype to represent the one or more of the normal activities identified for the one or more applications; and
   distribute an executable to the one or more devices, the executable to cause one or more of the devices to access the phenotype to identify malware.

2. The application phenotyping system of claim 1, wherein the executable is to cause at least one of the one or more devices to determine a confidence score by comparing a first behavior of a first application of the at least one device to at least one of: the phenotype for the first application, the phenotype for one or more trusted applications, or the phenotype for one or more known malware applications.

3. The application phenotyping system of claim 1, wherein a first device of the one or more devices includes a malware detection system to execute the executable to identify the malware.

4. The application phenotyping system of claim 1, wherein the one or more processors are to distribute the executable to a malware detection system communicatively coupled to a first device of the one or more devices over a network.

5. The application phenotyping system of claim 1, wherein the executable is to cause at least one of the one or more devices to associate a first behavior with a first application by:
   comparing a fourth sequence of at least two of the two or more operations that the first application caused to occur with the one or more behaviors to determine a confidence score; and
   determining that the confidence score satisfies a threshold.

6. The application phenotyping system of claim 5, wherein the executable is to compare the at least two of the two or more operations with:
   the one or more behaviors to be performed on a first device of the one or more devices;
   the one or more behaviors to be performed on the one or more devices within a same enterprise as the first device; and
   the one or more behaviors to be performed on the one or more devices monitored by the application phenotyping system.

7. The application phenotyping system of claim 6, wherein the confidence score is determined by independently weighting the comparisons of the at least two of the two or more operations, and, the one or more behaviors are to be performed on:
   the first device;
   the one or more devices within the same enterprise as the first device; and
   all devices monitored by the system.

8. A method for performing malware detection, the method comprising:
   determining two or more first-tier rules, respective ones of the two or more first-tier rules referencing a corresponding sequence of two or more operations to be performed by one or more applications to be executed on one or more devices;
   identifying second-tier rules, respective ones of the second-tier rules including a corresponding sequence of at least two of the first-tier rules;
   identifying one or more behaviors including a third sequence of at least two of the second-tier rules, the one or more behaviors to represent one or more normal activities to be performed by the one or more applications;
   identifying a phenotype for the one or more applications, the phenotype including one or more of the behaviors, the phenotype to represent one or more of the normal activities for the one or more applications; and
   distributing an executable to the one or more devices, the executable to cause one or more of the devices to access the phenotype to identify malware.

9. The method of claim 8, wherein the executable is to cause a first device of the one or more devices to determine a confidence score by comparing a first behavior of a first application of the first device to at least one of: the phenotype for the first application, the phenotype for one or more trusted applications, or the phenotype for one or more known malware applications.

10. The method of claim 8, wherein the executable is to cause a first device of the one or more devices to associate a first behavior with a first application by:
    comparing a fourth sequence of at least two of the two or more operations that the first application caused to occur with the one or more behaviors to generate a confidence score; and
    determining that the confidence score satisfies a threshold.

11. The method of claim 10, wherein the executable is to cause the first device to compare the at least two of the two or more operations with:
    the one or more behaviors to be performed on the first device;
    the one or more behaviors to be performed on the one or more devices within a same enterprise as the first device; and
    the one or more behaviors to be performed on second devices, the second devices including the first device and the one or more devices within the same enterprise as the first device.

12. The method of claim 11, wherein the confidence score is determined by independently weighting the comparisons of the at least two of the two or more operations, and, the one or more behaviors to be performed on:
- the first device;
- the one or more devices within the same enterprise as the first device; and
- all devices monitored by a system.

13. The method of claim 8, wherein the phenotype for a first application of the one or more applications is accessed each time the first application is launched.

14. The method of claim 8, wherein the executable is to cause a first device of the one or more devices to access the phenotype from a location remote to the one or more devices.

15. At least one storage disk or storage device, comprising instructions that, when executed, cause one or more processors of a first device to at least:
- determine two or more first-tier rules, respective ones of the two or more first-tier rules referencing a corresponding sequence of two or more operations that a first application caused to occur on the first device;
- determine one or more second-tier rules, respective ones of the one or more second-tier rules referencing a corresponding sequence of two or more of the two or more first-tier rules;
- determine a first behavior;
- when the first behavior is not associated with one or more behaviors associated with one or more normal activities to be performed by the first application, compare the first behavior to a phenotype for one or more known malware applications, the first behavior corresponding to a sequence of at least two of the second-tier rules;
- determine whether the first behavior is indicative of malware based on the comparison of the first behavior to the phenotype for the one or more known malware applications; and
- perform a corrective action on the first device when the first behavior is indicative of malware.

16. The at least one storage disk or storage device of claim 15, wherein the instructions cause the one or more processors to determine whether the first behavior is indicative of malware by determining a confidence score by comparing the first behavior to at least one of: the phenotype for the first application, the phenotype for one or more trusted applications, or the phenotype for the one or more known malware applications.

17. The at least one storage disk or storage device of claim 15, further including instructions to cause the one or more processors to determine whether the first behavior is associated with the one or more normal activities to be performed by the first application by:
- comparing corresponding sequences of the two or more operations that the first application caused to occur with the one or more behaviors to generate a confidence score; and
- determining whether the confidence score satisfies a threshold.

18. The at least one storage disk or storage device of claim 17, wherein the instructions cause the one or more processors to compare at least one of the corresponding sequences of the two or more operations with:
- the one or more behaviors performed on the first device;
- the one or more behaviors performed on second devices within a same enterprise as the first device; and
- the one or more behaviors performed on third devices monitored by a malware detection system, the third devices including the first device and the second devices.

19. The at least one storage disk or storage device of claim 18, wherein the confidence score is determined by independently weighting the comparisons of at least one of the corresponding sequences of the two or more operations to the one or more behaviors to be performed on:
- the first device;
- the second devices; and
- the third devices.

20. The at least one storage disk or storage device of claim 15, wherein the instructions cause the one or more processors to access the phenotype at launch of the first application.

21. The at least one storage disk or storage device of claim 15, wherein the instructions cause the one or more processors to access the phenotype from a location remote to the first device.

22. A device, comprising:
- one or more processors; and
- a memory including instructions that, when executed, cause the one or more processors to:
  - determine two or more first-tier rules, respective ones of the two or more first-tier rules referencing a corresponding sequence of two or more operations that a first application caused to occur on the device;
  - determine one or more second-tier rules, respective ones of the one or more second-tier rules referencing a corresponding sequence of two or more of the first-tier rules;
  - determine a first behavior;
  - when the first behavior is not associated with one or more behaviors associated with one or more normal activities to be performed by the first application, compare the first behavior to a phenotype for one or more known malware applications, the first behavior corresponding to a sequence of at least two of the second-tier rules;
  - determine whether the first behavior is indicative of malware based on the comparison of the first behavior to the phenotype for the one or more known malware applications; and
  - perform a corrective action on the device when the first behavior is indicative of malware.

23. The device of claim 22, wherein the one or more processors are to store data representative of the first behavior in a secure storage location communicatively coupled to the device when the first behavior is not associated with the one or more behaviors.

24. The device of claim 22, wherein the one or more processors are to monitor memory operations occurring on the device to identify the two or more operations.

25. The device of claim 22, wherein the phenotype is a first phenotype and the one or more processors are to determine that the first behavior is indicative of malware when:
- a second phenotype of the first application that caused the first behavior to occur and a third phenotype of one or more trusted applications do not include the first behavior; or
- the first phenotype of the one or more known malware applications include the first behavior.

* * * * *